US011179886B2

(12) United States Patent
Jiang et al.

(10) Patent No.: US 11,179,886 B2
(45) Date of Patent: Nov. 23, 2021

(54) ADDITIVE PROCESSING OF FLUOROPOLYMERS

(71) Applicant: 3M INNOVATIVE PROPERTIES COMPANY, St. Paul, MN (US)

(72) Inventors: Xuan Jiang, Maplewood, MN (US); Jeffrey N. Bartow, West Saint Paul, MN (US); Carsten Franke, Saint Paul, MN (US); Fee Zentis, Waging am See (DE); Klaus Hintzer, Kastl (DE); Gabriele H. Gottschalk-Gaudig, Mehring (DE); Sebastian F. Zehentmaier, Obing (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 261 days.

(21) Appl. No.: 16/071,759

(22) PCT Filed: Jan. 19, 2017

(86) PCT No.: PCT/US2017/014181
§ 371 (c)(1),
(2) Date: Jul. 20, 2018

(87) PCT Pub. No.: WO2017/127572
PCT Pub. Date: Jul. 27, 2017

(65) Prior Publication Data
US 2019/0030795 A1    Jan. 31, 2019

Related U.S. Application Data

(60) Provisional application No. 62/408,504, filed on Oct. 14, 2016, provisional application No. 62/385,439, filed on Sep. 9, 2016, provisional application No. 62/281,349, filed on Jan. 21, 2016.

(51) Int. Cl.
| | | |
|---|---|---|
| B29C 64/165 | (2017.01) | |
| C08L 27/18 | (2006.01) | |
| B33Y 80/00 | (2015.01) | |
| B33Y 10/00 | (2015.01) | |
| B33Y 70/00 | (2020.01) | |
| C08L 23/12 | (2006.01) | |
| C08F 259/08 | (2006.01) | |
| B33Y 30/00 | (2015.01) | |
| B33Y 40/00 | (2020.01) | |
| B29C 64/106 | (2017.01) | |
| B29C 64/30 | (2017.01) | |
| C08F 214/26 | (2006.01) | |
| C09D 11/101 | (2014.01) | |
| C09D 11/106 | (2014.01) | |
| B29K 27/18 | (2006.01) | |
| B29K 27/00 | (2006.01) | |
| B33Y 40/20 | (2020.01) | |
| B29C 64/124 | (2017.01) | |
| B29K 105/00 | (2006.01) | |
| B29K 27/12 | (2006.01) | |

(52) U.S. Cl.
CPC .......... *B29C 64/165* (2017.08); *B29C 64/106* (2017.08); *B29C 64/30* (2017.08); *B33Y 10/00* (2014.12); *B33Y 30/00* (2014.12); *B33Y 40/00* (2014.12); *B33Y 70/00* (2014.12); *B33Y 80/00* (2014.12); *C08F 214/26* (2013.01); *C08F 259/08* (2013.01); *C08L 23/12* (2013.01); *C08L 27/18* (2013.01); *C09D 11/101* (2013.01); *C09D 11/106* (2013.01); *B29C 64/124* (2017.08); *B29K 2027/12* (2013.01); *B29K 2027/14* (2013.01); *B29K 2027/16* (2013.01); *B29K 2027/18* (2013.01); *B29K 2105/0094* (2013.01); *B33Y 40/20* (2020.01); *C08L 2205/05* (2013.01)

(58) Field of Classification Search
CPC ..... B29C 64/165; B33Y 10/00; C09D 11/101; C09D 11/106; B29K 2027/12
See application file for complete search history.

(56) References Cited

U.S. PATENT DOCUMENTS

| | | | |
|---|---|---|---|
| 2,434,058 | A | 1/1948 | Stenzel |
| 2,965,595 | A | 12/1960 | Brinker |
| 2,968,649 | A | 1/1961 | Pailthrop |
| 3,051,677 | A | 8/1962 | Rexford |
| 3,318,854 | A | 5/1967 | Honn et al. |
| 3,850,590 | A | 11/1974 | Chalkley et al. |
| 3,855,191 | A | 12/1974 | Doughty, Jr. |
| 4,120,608 | A | 10/1978 | Vassiliou |
| 4,281,092 | A | 7/1981 | Breazeale |

(Continued)

FOREIGN PATENT DOCUMENTS

| | | |
|---|---|---|
| CN | 1326828 A | 12/2001 |
| CN | 101080448 A | 11/2007 |

(Continued)

OTHER PUBLICATIONS

Drummer, "Development of a Characterization Approach for the Sintering Behavior of New Thermoplastics for Selective Laser Sintering", Physics Procedia, 2010, vol. 5, pp. 533-542.
Goodridge, "Laser Sintering of Polyamides and Other Polymers", Progress in Materials Science, 2012, vol. 57, pp. 229-267.
Rietzel, "New Thermoplastic Powder for Selective Laser Sintering", Kunststoffe International-Online Magazine for Plastics, Jan. 2008, vol. 98, No. 2, pp. 42-45.
Wendel, "Additive Processing of Polymers", Macromolecular Materials and Engineering, 2008, vol. 293, pp. 799-809.
International Search Report for PCT International Application No. PCT/US2017/014156, dated Apr. 28, 2017, 4 pages.

(Continued)

*Primary Examiner* — Kelly M Gambetta
(74) *Attorney, Agent, or Firm* — Thomas M. Spielbauer

(57) ABSTRACT

Provided are method of producing a shaped fluoropolymer articles. The methods include subjecting a composition comprising a fluoropolymer to additive processing in an additive processing device. Also provided are articles obtained with the methods and 3D-printable compositions.

16 Claims, No Drawings

(56) References Cited

U.S. PATENT DOCUMENTS

| | | |
|---|---|---|
| 4,349,650 A | 9/1982 | Krespan |
| 4,558,141 A | 12/1985 | Squire |
| 4,605,773 A | 8/1986 | Maloney |
| 4,612,351 A | 9/1986 | Caporiccio et al. |
| 4,808,651 A | 2/1989 | Blickle |
| 5,077,870 A | 1/1992 | Melbye et al. |
| 5,178,644 A | 1/1993 | Huzinec |
| 5,229,480 A | 7/1993 | Uschold |
| 5,285,002 A | 2/1994 | Grootaert |
| 5,378,782 A | 1/1995 | Grootaert |
| 5,442,097 A | 8/1995 | Obermeier et al. |
| 5,554,680 A | 9/1996 | Ojakaar |
| 5,565,512 A | 10/1996 | Saito et al. |
| 5,621,145 A | 4/1997 | Saito et al. |
| 5,658,063 A | 8/1997 | Nasserbakht |
| 5,688,884 A | 11/1997 | Baker |
| 5,700,859 A | 12/1997 | Ogura |
| 5,700,879 A | 12/1997 | Yamamoto et al. |
| 5,763,552 A | 6/1998 | Feiring |
| 5,767,204 A | 6/1998 | Iwa et al. |
| 5,891,965 A | 4/1999 | Worm et al. |
| 5,895,799 A | 4/1999 | Wu |
| 5,905,545 A | 5/1999 | Poradish et al. |
| 6,025,307 A | 2/2000 | Chittofrati |
| 6,103,843 A | 8/2000 | Abusleme |
| 6,126,849 A | 10/2000 | Yamana |
| 6,132,660 A | 10/2000 | Kampfer |
| 6,255,535 B1 | 7/2001 | Schulz et al. |
| 6,255,536 B1 | 7/2001 | Worm et al. |
| 6,294,627 B1 | 9/2001 | Worm et al. |
| 6,429,258 B1 | 8/2002 | Morgan et al. |
| 6,472,452 B2 | 10/2002 | Ruepping |
| 6,495,213 B2 | 12/2002 | Ruepping |
| 6,506,460 B1 | 1/2003 | Paglia |
| 6,562,415 B2 | 5/2003 | Ruepping |
| 6,587,159 B1 | 7/2003 | Dewald |
| 6,599,586 B2 | 7/2003 | Ruepping |
| 6,602,557 B2 | 8/2003 | Ruepping |
| 6,613,941 B1 | 9/2003 | Felix et al. |
| 6,706,193 B1 | 3/2004 | Burkard et al. |
| 6,746,723 B2 | 6/2004 | Paglia |
| 6,794,550 B2 | 9/2004 | Hintzer et al. |
| 6,803,391 B2 | 10/2004 | Paglia |
| 7,018,541 B2 | 3/2006 | Hintzer et al. |
| 7,164,397 B2 | 1/2007 | Pettitt et al. |
| 7,360,905 B2 | 4/2008 | Davis et al. |
| 7,569,273 B2 | 8/2009 | Bredt |
| 8,097,673 B2 | 1/2012 | Jones |
| 8,354,170 B1 | 1/2013 | Henry et al. |
| 8,705,133 B2 | 4/2014 | Lieb et al. |
| 8,820,944 B2 | 9/2014 | Vasquez |
| 8,969,500 B2 | 3/2015 | Hintzer et al. |
| 2003/0138580 A1 | 7/2003 | Blong |
| 2003/0162923 A1 | 8/2003 | Funaki et al. |
| 2004/0091298 A1 | 5/2004 | Nellen |
| 2004/0171736 A1 | 9/2004 | Dadalas |
| 2005/0003189 A1* | 1/2005 | Bredt .................. B29C 64/165 428/402 |
| 2005/0006811 A1 | 1/2005 | Blong |
| 2006/0290032 A1 | 12/2006 | Sano |
| 2007/0015937 A1 | 1/2007 | Hintzer et al. |
| 2007/0031791 A1 | 2/2007 | Cinader, Jr. et al. |
| 2009/0233045 A1 | 9/2009 | Slama et al. |
| 2010/0283188 A1 | 11/2010 | Rohner et al. |
| 2011/0172338 A1 | 7/2011 | Murakami |
| 2012/0129982 A1 | 5/2012 | Zipplies et al. |
| 2012/0201960 A1 | 8/2012 | Hartmann |
| 2013/0040142 A1 | 2/2013 | Frey et al. |
| 2013/0081599 A1 | 4/2013 | Collet |
| 2013/0010981 A1 | 5/2013 | Xie et al. |
| 2014/0080066 A1 | 3/2014 | Meya et al. |
| 2014/0113105 A1 | 4/2014 | Yasukochi |
| 2015/0125334 A1* | 5/2015 | Uetani .................. B22F 3/008 419/6 |
| 2016/0126631 A1 | 5/2016 | Yosui et al. |
| 2016/0185962 A1 | 6/2016 | Zhou et al. |
| 2016/0318250 A1 | 11/2016 | Moussa |
| 2017/0015848 A1 | 1/2017 | Aruga |
| 2017/0283655 A1 | 10/2017 | Kennet et al. |
| 2017/0342303 A1 | 11/2017 | Stevenson et al. |
| 2018/0126631 A1 | 5/2018 | Nauka et al. |
| 2018/0250877 A1 | 9/2018 | Okamoto et al. |
| 2018/0298155 A1 | 10/2018 | Hosoda et al. |
| 2019/0184632 A1 | 6/2019 | Achten et al. |

FOREIGN PATENT DOCUMENTS

| | | |
|---|---|---|
| CN | 102205524 A | 10/2011 |
| CN | 202088120 U | 12/2011 |
| CN | 103264361 A | 8/2013 |
| CN | 103273432 A | 9/2013 |
| CN | 103762093 A | 4/2014 |
| CN | 104140668 A | 11/2014 |
| CN | 104440597 A | 3/2015 |
| CN | 104530668 A | 4/2015 |
| CN | 103476570 B | 11/2015 |
| CN | 105017734 A | 11/2015 |
| CN | 105081992 A | 11/2015 |
| CN | 103709737 | 3/2016 |
| CN | 105711104 | 6/2016 |
| CN | 108401513 A | 8/2018 |
| CN | 108495876 A | 9/2018 |
| EP | 003063 | 7/1979 |
| EP | 086397 | 8/1983 |
| EP | 0 466 422 A1 | 1/1992 |
| EP | 0752432 | 8/1999 |
| EP | 0712882 | 4/2000 |
| EP | 0969027 | 10/2003 |
| EP | 1 666 234 A1 | 6/2006 |
| EP | 1148072 | 8/2009 |
| EP | 1059342 | 7/2010 |
| EP | 2 251 185 A1 | 11/2010 |
| EP | 1529785 | 3/2011 |
| EP | 1097948 | 6/2011 |
| EP | 1533325 | 10/2011 |
| EP | 2 592 116 A1 | 5/2013 |
| EP | 2488347 | 3/2014 |
| EP | 2 821 543 A1 | 1/2015 |
| EP | 2 881 430 A1 | 6/2015 |
| EP | 2902424 | 8/2015 |
| JP | S61-198678 A | 9/1986 |
| JP | H06-262693 A | 9/1994 |
| JP | 2005-297325 A | 10/2005 |
| JP | 2010-106102 A | 5/2010 |
| WO | WO 98/09798 A1 | 3/1998 |
| WO | WO 2000-009603 | 2/2000 |
| WO | WO 2000-022002 | 4/2000 |
| WO | WO 2000-071590 | 11/2000 |
| WO | WO 2001-046107 | 6/2001 |
| WO | WO 01/78969 A2 | 10/2001 |
| WO | WO 2002/045907 A2 | 6/2002 |
| WO | WO 2003-051988 | 6/2003 |
| WO | WO 2003-059992 | 7/2003 |
| WO | WO 2004-113042 | 12/2004 |
| WO | WO 2006/065334 A1 | 6/2006 |
| WO | WO 2006/091519 A2 | 8/2006 |
| WO | WO 2007-133912 | 11/2007 |
| WO | WO-2007133912 A2 * | 11/2007 ........... B29C 64/153 |
| WO | WO 2008-140914 | 11/2008 |
| WO | WO 2010/151610 A2 | 12/2010 |
| WO | WO 2011-014715 | 2/2011 |
| WO | WO 2011-139807 | 11/2011 |
| WO | WO 2012-012289 | 1/2012 |
| WO | WO 2012-018603 | 2/2012 |
| WO | WO 2012/166546 A2 | 12/2012 |
| WO | WO 2013/123156 A1 | 8/2013 |
| WO | WO 2015/006697 A1 | 1/2015 |
| WO | WO 2017/014784 A1 | 1/2017 |
| WO | WO 2017/083255 A1 | 5/2017 |
| WO | WO 2017/116678 A1 | 7/2017 |
| WO | WO 2017/116679 A1 | 7/2017 |
| WO | WO 2017/117035 A1 | 7/2017 |
| WO | WO 2017-127392 | 7/2017 |
| WO | WO 2017-127561 | 7/2017 |

(56) References Cited

FOREIGN PATENT DOCUMENTS

| WO | WO 2017-127569 | 7/2017 |
| WO | WO 2017/127572 A1 | 7/2017 |
| WO | WO 2018-118956 | 6/2018 |
| WO | WO 2017-173009 | 10/2018 |

OTHER PUBLICATIONS

International Search Report for PCT International Application No. PCT/US2017/014174, dated May 11, 2017, 5 pages.
International Search Report for PCT International Application No. PCT/US2017/014181, dated May 3, 2017, 4 pages.
Bommel, "Drying of Silica Gels With Supercritical Carbon Dioxide", Journal of Materials Science, 1994, vol. 29, pp. 943-948.
Hintzer, "Fluoropolymer, Organic", Ullmann's Encyclopedia of Industrial Chemistry, 7th Edition, 2013, pp. 35-38.
Logothetis, "Chemistry of Fluorocarbon Elastomers", Progress in Polymer Science, 1989, vol. 14, No. 2, pp. 251-296.
McHugh, "Supercritical Fluid Extraction: Principles and Practice", Department of Chemical Engineering, 2nd Edition, 1986, pp. 1-10.
Smith, Handbook of Fluoropolymer Sceince and Technology, 377-391, (2014).
https://www.ifam.fraunhofer.de/en/Profile/Locations/Dresden.html, 7 pages.
International Search Report for PCT International Application No. PCT/IB2018/055355, dated Feb. 8, 2019, 7 pages.
International Search Report for PCT International Application No. PCT/US2018/040234, dated Oct. 19, 2018, 6 pages.

\* cited by examiner

ADDITIVE PROCESSING OF FLUOROPOLYMERS

CROSS REFERENCE TO RELATED APPLICATIONS

This application is a national stage filing under 35 U.S.C. 371 of PCT/US2017/014181, filed Jan. 19, 2017, which claims the benefit of Provisional Application No. 62/281,349, filed Jan. 21, 2016 and Provisional Application No. 62/385,439, filed on Sep. 9, 2016 and Provisional Application No. 62/408,504, filed on Oct. 14, 2016, the disclosures of which are incorporated by reference in their entirety herein.

FIELD

The present disclosure relates to additive processing of fluoropolymers, to fluoropolymer articles obtained by additive processing, and to fluoropolymer compositions useful for additive processing.

BACKGROUND

Fluoropolymers are widely used as raw materials for their chemical inertness, in particular for articles requiring low friction properties and/or inertness to chemical reactivity, heat, or both.

Fluoropolymers are typically classified into thermoplastics and elastomers (sometimes also referred to as fluororubbers).

Fluorothermoplastics can be processed by conventional melt shaping methods, such as injection molding and extrusion. Fluorothermoplastics typically are copolymers of tetrafluoroethylene (TFE) with one or more other perfluorinated, partially fluorinated or non-fluorinated comonomers. Copolymers of TFE and perfluorinated alkyl or allyl ethers are known in the art as PFA's (perfluorinated alkoxy polymers). Copolymers of TFE and hexafluoropropylene (HFP) with or without other perfluorinated comonomers are known in the art as FEP's (floor mated ethylene propylene). Copolymers of TFE, HFP and vinylidenefluoride (VDF) are known in the art as THV. Other types of melt-processable fluoropolymers are based on vinylidenefluoride homo- or copolymers, known in the art as PVDF. Copolymers of TFE and ethylene are known as ETFE.

Certain types of thermoplastics, have a very high melt viscosity (low melt flow index (MFI) and are termed in the art as "non-melt processable". Non-melt processable fluoropolymers include homopolymers of TFE or copolymers of TFE with other copolymerizable perfluorinated monomers, wherein the amount of comonomers is limited to less than 1% wt. Such TFE homo- and copolymers are referred to in the art as PTFE. PTFE has such a high melt viscosity that it cannot be processed by conventional melt processing techniques such as extrusion, injection molding or blow molding. Instead PTFE articles typically are produced by paste extrusion, or by sintering to produce blocks or billets which are then shaped into articles. For example by skiving, turning, machining (i.e., substractive methods where material is removed to shape articles).

In WO2007/133912 A2 an additive manufacturing process for special thermoplastic fluoropolymers (PVDF and PCTF) are described but examples are not provided. In CN103709737 A and CN 105711104 A methods for 3D printing are described where the use of PTFE is mentioned. The materials are processed by irradiating a polymer powder with infrared or lasers and melting the powder in selected areas exposed to the IR- or laser irradiation. These methods are known in art of 3D-printing as laser melting or laser sintering. In U.S. Pat. No. 7,569,273 B2 a different method is described that is reported to be suitable for PVDF. Examples are also not provided. The method described in U.S. Pat. No. 7,569,273 B2 involves adding a fluid through a nozzle to a solid composition comprising the polymer and an adhesive particulate material. The articulate material becomes adhesive upon contact with the fluid and thus is reported to crease an article by distributing the fluid on selected areas.

There is a need for providing alternative methods of processing fluoropolymers by additive processing and in particular there is a need for processing fluoropolymers of the non-melt processable type.

SUMMARY

In one aspect there is provided a method of producing a fluoropolymer article comprising subjecting a composition comprising fluoropolymer particles and a binder material to additive processing in an additive processing device containing at least one energy source and wherein the fluoropolymer is a homopolymer or copolymer of tetrafluoroethylene (TFE) and wherein the binder material is capable of binding the fluoropolymer particles to form a layer in a part of the composition that has been exposed to the energy source of the additive processing device and the method further comprises subjecting a part of the composition to exposure of the energy source to form a layer.

In another aspect there is provided a composition for producing an article by additive processing in an additive processing device comprising fluoropolymer particles, optionally, one or more filler, and a binder material; wherein the fluoropolymer is a homopolymer or copolymer of tetrafluoroethylene (TFE) and wherein the binder material comprises an organic material having carbon-carbon bonds and carbon-hydrogen bonds and melts between 40° C. and 140° C.

In a further aspect a 3D-printed fluoropolymer is provided that is obtainable by the above method.

In yet another aspect there is provided an article comprising a 3D-printed fluoropolymer obtainable by the above method.

DETAILED DESCRIPTION

The present Applicants have observed that it is difficult to create fluoropolymer articles, having a complex design with the traditional methods. Shaping articles by removing excess fluoropolymer (for example through skiving or die cutting) wastes expensive fluoropolymer material. Articles produced by injection molding are less wasteful, however the construction of molds can be expensive and time consuming. Rapid prototyping to identify optimized article designs by traditional methods, therefore, can be economically impractical.

Therefore, there is a need to provide alternative production methods for producing fluoropolymer articles.

Before any embodiments of this disclosure are explained in detail, it is to be understood that the disclosure is not limited in its application to the details of construction and the arrangement of components set forth in the following description. Also, it is to be understood that the phraseology and terminology used herein is for the purpose of description. Contrary to the use of "consisting", the use of "including." "containing", "comprising," or "having" and variations thereof is meant to encompass the items listed thereafter and equivalents thereof as well as additional items. The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

All references cited herein are incorporated by reference unless stated otherwise.

ASTMs or other scientific norms referred to herein are those that were active at the time of filing the earliest priority application if the year is not specified. If at the time of the earliest priority filing the ASTM of other norm was not active anymore, than the most recent active version is referred to.

The present applicants have found that fluoropolymer articles can be prepared by additive processing. The fluoropolymers are provided as a composition that is suitable for additive processing and can then be processed into a three dimensional article by additive processing, typically, in an additive processing device. Various known additive processing techniques may be used and also various known additive processing devices or 3D printers may be used. Such 3D printable compositions contain the fluoropolymers and additional material that is capable of binding fluoropolymer particles into a volume element or a layer by melting or liquefying upon the material being exposed to an energy source, typically the energy source of the additive processing device. "Liquefying" as used herein means that the material significantly reduces its viscosity and becomes flowable. It is believed that the molten or liquefied material may embed or encapsulate the fluoropolymer particles and/ or binds them and thus keeps them in the selected location. Such one or more additional materials are therefore also referred herein as "binder material".

Fluoropolymer containing layers may be created successively to form a three-dimensional object. After the creation of the article in the additive processing device the additional material may be removed, typically by heat treatment which may include degradation or combustion. This step may be followed by other work-up steps, which may include, for example, sintering the article.

An advantage of the methods provided herein is that not only prototypes of fluoropolymer articles can be produced at low costs but also fluoropolymer articles of complex shape and design may be created that may not be available through conventional fluoropolymer processing or only at higher costs.

The methods provided herein are also less wasteful because unreacted 3D printable compositions may be reused in a next 3D print run.

Additive Processing

Additive processing, also known as "3D printing", or "additive manufacturing (AM)", refers to a process to create a three-dimensional object by sequential deposition or formation of materials in defined areas, typically by generating successive layers of material. The object is typically produced under computer control from a 3D model or other electronic data source by an additive printing device typically referred to as a 3D printer. The term "3D printer" and "additive processing device" are used herein interchangeably and generally refer to a device by which additive processing can be carried out. The terms "3D-printing" and "3D-printable" are used likewise and mean additive processing and suitable for additive processing.

Additive processing devices are devices by which sequential deposition or formation of material in defined areas can be achieved, typically by deposition or creation of volume elements, such as layers. Successive layers are built up, layer-on-layer to create a three-dimensional object.

Typically an additive processing device is computer-controlled and creates the desired object based on an electronic image of the object to be created. The 3D printer contains an energy source that applies energy to a localised area in a 3D-printable composition. The energy applied may be, for example, heat or irradiation or both. The energy source may include a light source, a laser, e-beam generators, heat generators and other sourcing capable of focusing energy to defined areas of the 3D-printable composition. The energy source may be moved to defined areas over the surface of the 3D printable composition, typically under computer control.

The additive processing device typically also contains a platform that can be moved into the 3D-printable composition or out of it, typically, by the distance of the layers to be formed on the platform. Typically this is also done under computer control. The device may further contain a device such as a wiper blade or an injection nozzle by which new printable material can be applied over the layer formed for successive layer-on-layer building. Support structures may be used and later removed in case the object to be created is complex or requires structural support during its creation.

Additive processing techniques are known. Objects can be created from liquid 3D printable compositions or solid 3D-printable compositions depending on the additive processing method and device used.

In one embodiment of the present disclosure the layers are created from a solid composition. The 3D printable composition is typically provided in the form of particles, for example in the form of a powder, or in case of the filament deposition process, in the form of an extrudate, for example extruded into filaments. The fluoropolymer and the binder material may be present as particles or the fluoropolymer particles may be coated with the binder material. The fluoropolymer particles are fused selectively by bringing the binder material to the melt (or liquefying it) using an energy source, typically a heat source. Depending on the melting temperature of the binder material a high or low heat source may be used. A laser may be used in case of selective layer sintering (SLS) or selective layer melting (SLM), or an electron beam in case of electron beam melting (EBM). If lower temperatures are sufficient for the formation of volume elements through melting or liquefying, heated wires and thermal print heads may be used (also referred to as "thermal printing"). Typically decomposition or melting of the fluoropolymer should be avoided and the energy source should be chosen accordingly. Processes may include one or more thermal sources for inducing fusion between powder particles by the binder material, a method for controlling powder fusion to a prescribed region of each layer, and a mechanisms for adding and smoothing powder layers or removing powder layers. Fusion mechanisms can include but are not limited to mechanisms based on adhesion or providing a physical barriers, for example by encapsulation or combinations thereof.

Some of the disclosed methods use an energy source to fuse particles into a mass that has a desired three-dimensional shape. The focused energy source selectively fuses powdered material by scanning cross-sections generated from a 3-D digital description of the part (for example from CAD file or scan data) on the surface of a powder bed. After each cross-section is scanned, the powder bed is lowered (or raised depending on the design of the 3D printer) by one layer thickness, a new layer of material is applied on top, and the process is repeated until the part is complete. In selective laser sintering (SLS) or melting (SLM), typically a pulsed laser is used and in EBM an electron beam is used. In 3D thermal printing a heated wire or a thermal print head or other heat sources may be used. The heat may be generated for example, by electricity or irradiation or other appropriate means of generating increased temperatures. In the process of the present disclosure the binder material melts or liquefies upon exposure to the energy source thus binding (or "fusing") the fluoropolymer particles into a volume element.

The processing device may preheat the bulk powder material in the powder bed somewhat below its melting point, to make it easier for the energy source to raise the temperature of the selected regions the rest of the way to the melting point. The above described methods are referred to herein as laser melting if a laser is used to bring about the particle fusion or as thermal printing if another heat source other than a laser is bringing about the particle fusion.

The additive manufacturing method for producing an article by these methods may typically comprise:
(i) providing a composition comprising a 3D printable fluoropolymer composition comprising fluoropolymer particles and binder material and optionally other ingredients;
(ii) causing the binder to melt or to liquefy and to bind fluoropolymer particles by either (a): directing energy from the energy source of the additive manufacturing device to a selected location of the 3D printable composition and causing the binder material to melt or to liquefy and to bind fluoropolymer particles in the selected location; or (b): directing a selected location of the 3D printable composition to the energy source and causing the binder material to melt or to liquefy and to bind fluoropolymer particles, or a combination of (a) and (b);
(iii) directing either (c) the energy source away from the 3D printable composition, or vice-versa (d) directing the 3D printable composition away from the energy source or both to avoid the binder material to bind fluoropolymer particles in the non-selected locations, or a combination of (c) and (d);
(iv) repeating steps (ii) and (iii), and if necessary also step (i), to form multiple layers and create an article. If necessary new 3D printable compositions can be added or unreached material may be removed after steps (ii) and/or (iii).

The heat source can be selected as described above and is chosen to be compatible with the ingredients of the 3D printable composition.

The 3D printable compositions for these processes typically comprise a solid composition of fluoropolymer particles and binder material particles, or a composition of fluoropolymer particles coated with binder material or a combination thereof, preferably a solid composition. Preferably, the composition is a loose powder or a loose particulate composition. The compositions may also contain other ingredients as described herein, preferably solid ingredients. The fluoropolymers, binder materials and other ingredients can be used as described herein.

Directed energy deposition (DED) processes deposit a material that is molten or comprises molten binder material or is converted into a flowable or extrudable material through one or more deposition devices, for example extrusion nozzles. These methods use one or more energy source to process the 3D printable composition through the deposition device DED processes enable the creation of parts by melting material as it is being deposited, not by melting material that is pre-laid in a powder bed. As a focused heat source, a laser or electron beam may be used; or heat generated by extrusion, for example an extrusion device or a component of an extrusion device may be sufficient for this purpose. The extrusion device or the component thereof may be heated and the composition may be preheated before entering the extrusion device. In extrusion-layered deposition systems (e.g. fused filament fabrication systems and other melt-extrusion additive manufacturing processes) articles are produced layer-by-layer by extruding a 3D-printable composition through an extrusion head. Movement of the extrusion head with respect to the substrate onto which the substrate is extruded is performed under computer control, in accordance with the build data that represents the article, for example a CAD file. The composition can be extruded through a nozzle carried by an extrusion head and deposited as a sequence of roads on a substrate in an x-y plane. The roads can be in the form of continuous beads or in the form of a series of droplets (e.g. as described, for example in US Patent Application No 2013/0081599). The extruded composition fuses to previously deposited composition as it solidifies upon a drop in temperature. This can provide at least a portion of the first layer of the three-dimensional article. By changing the position of the extrusion head relative to the first layer additional rows can be repeatedly build. This 3D-printing method is also known under the term "fused deposition modelling or "FDM". The compositions provided herein may also be used in FDM, in which case they are formulated such that they can be extruded, for example as extrudable solid compositions or as extrudable pastes. The binder material typically melts during the extrusion process and the composition is deposited on selected locations where the molten binder material may solidity and thus binds the fluoropolymer particles.

The additive manufacturing method for producing an article by these deposition methods may typically comprise
(i) providing an extrudable composition comprising a 3D printable fluoropolymer composition comprising fluoropolymer particles and the binder material and optionally other ingredients;
(ii) extruding the composition to a selected location wherein the binder material has been molten or liquefied by the energy source of the device to bind the fluoropolymer particles,
(iii) repeating step (ii) and if necessary also step (i) to form multiple layers and create an article.

The heat source can be selected as described above and can be adapted to the binder material and other ingredients present in the 3D printable composition. Typically the heat source is an extruder or a component of an extruder, or for example the nozzle of an extrusion head. The extruder or at least some of its components may be heated. The composition is preferably extruded through an extrusion nozzle of a heated extruder head.

The 3D printable composition for these processes typically comprise an extendable 3D printable composition, for example a paste or a solid extrudate such as filaments or pellets. The filaments or pellets may then be heated and extruded again in the 3D printer.

The extendable composition may comprise the fluoropolymer particles and binder material particles, or comprise the fluoropolymer particles coated with binder material, or a combination thereof. The compositions may also contain other ingredients as described herein, preferably solid ingredients. The fluoropolymers, binder materials and other ingredients can be used as described herein.

Depending on the complexity of the article design supporting structures may be attached to the elevator platform to prevent deflection or delamination due to gravity and to hold cross sections in place in order to resist lateral pressure from any mechanical spreading device.

The methods provided herein can be carried out in the respective known and commercially available additive printing devices. Typical known methods and their 3D printer have been described, for example, in "Additive Processing of Polymers" by B. Wendel et al in *Macromol. Matter. Eng.* 2008, 293, 799-809. Examples of commercially available 3D printers include, but are not limited to 3D printers from BLUEPRINTER, Copenhagen. Denmark for powdered bed printing with thermal heads. Printers for filament extrusion (FDM) are available, for example, from Stratasys Direct. Inc., Valencia, Calif. 91355, for example model Makerbot Replicator 2.

Fluoropolymers

The fluoropolymers for use in the present disclosure contain repeating units derived from fluorinated or perfluorinated olefinic monomers and preferably perfluorinated olefinic monomers, more preferably exclusively of perfluorinated olefinic monomers.

Suitable fluoropolymers for use in the additive processing methods provided herein are thermoplastic fluoropolymers (fluorothermoplastics) including the non-melt processable fluoropolymers. The fluoropolymers can be conveniently prepared by aqueous emulsion polymerization as described for example in U.S. Pat. Nos. 2,434,058, 2,965,595 and EP 003 063 A2, EP 0 969 027. Alternatively, fluoropolymers may be prepared by solvent polymerization including organic solvents and inorganic solvents like liquid $CO_2$ or by suspension polymerization. Suspension polymerization may be carried out in aqueous media without using emulsifiers.

Fluorothermoplastics

Suitable fluorothermoplastics include copolymers of TFE and one or more perfluorinated, partially fluorinated or non-fluorinated comonomers. The comonomer content is typically greater than 1% wt, preferably greater than 2% wt and may be up to 30% wt. (as used hereinabove and below the weight percentages are based on total weight of the polymer—unless specified otherwise). Examples include: FEP (copolymers of TFE, HFP and other optional amounts of perfluorinated vinyl ethers); THV (copolymers of TFE, VDF and HFP), PFA (copolymers of TFE and perfluoroalkylvinylethers) and copolymers of TFE and ethylene (ETFE). Thermoplastic fluoropolymers can be prepared or obtained as described, for example, in "Fluoropolymer, Organic" in Ullmann's Encyclopedia of Industrial Chemistry, 7$^{th}$ edition, 2013, Wiley-VCH Verlag Chemie, Weinheim, Germany.

Preferred fluorothermoplastics include fluoropolymers with a melting point between 260 and 315° C. Other preferred fluorothermoplastics include those with a melt flow index (MFI) at 372° C. and 5 kg load (MFI 372/5) from 1 to 50 g/10 min, or from more than 0.1 to 50 g/10 min.

In one embodiment the fluorothermopolastics are PFAs. PFAs are copolymers of TFE and at least one perfluoro alkyl vinyl ether (PAVEs), perfluoro alkyl allyl ether (PAAEs) and combinations thereof and may or may not contain additional perfluorinated comonomers. Typical amounts of copolymers range from 1.7% to 10% wt. Preferably, the PFAs have a melting point between 150° C. and 315° C., for example between 180 to 280° C., or between 200 and 300° C.

Perfluorinated vinyl ethers (PAVEs) and allyl ethers (PAAEs) may have oxygen atoms in their perfluoroalkyl chain (such chains may also be referred to as perfluoroalkylether or perfluoroalkyloxy chains). Typical examples of PAVEs include but are not limited to perfluoromethyl vinyl ether (PMVE), perfluoropropyl vinyl ethers (PPVEs) and alkoxy vinyl ethers including those of the general formula:

$$CF_2=CFO(R_{f1}O)_n(R_{f2}O)_mRf$$

where $R_{f1}$ and $R_{f2}$ are different linear or branched perfluaroalkylene groups of 2-6 carbon atoms, m and n are independently 0-10, and Rf is a perfluoroalkyl group of 1-6 carbon atoms. Another class of perfluoro(alkyl vinyl) ethers includes compositions of the formula $$CF_2=CFO(CF_2CFXO)_nRf$$

where X is F or $CF_3$, n is 0-5, and Rf is a perfluoroalkyl group of 1-6 carbon atoms. Another class of perfluoro (alkyl vinyl) ethers includes those ethers wherein it is 0 or 1 and Rf contains 1-3 carbon atoms. Additional perfluoro (alkyl vinyl) ether monomers include compounds of the formula $$CF_2=CFO[(CF_2CFCFR_3O)_n(CF_2CF_2CF_2O)_m(CF_2)]_pCF_{2x+1}$$

where m and n independently are 1-10, p represents 0-3, and x represents 1-5. Other examples include those of the formula $CF_2=CFOCF_2OR$, wherein R is a $C_2$-$C_6$ linear or branched or cyclic perfluoroalkyl groups that may optionally contain one or more catenary oxygen atoms as described, for example, in EP 1 148 072. Also the allyl analogues may be used, i.e. polymers with $CF_2=CFCF_2$—O— unit instead of the vinyl unit $CF_2=CF$—O—.

Particular examples of perfluorovinyl ethers include:
$F_2C=CF$—O—$(CF_2)_2$—$OCF_3$,
$F_2C=CF$—O—$(CF_2)_3$—$OCF_3$,
$F_2C=CF$—O—$(CF_2)_4$—$OCF_3$,
$F_2C=CF$—O—$(CF_2)_3$—$(OCF_2)_2$—F,
$F_2C=CF$—O—$CF_2$—$(OCF_2)_3$—$CF_3$,
$F_2C=CF$—O—$CF_2$—$(OCF_2)_4$—$CF_3$,
$F_2C=CF$—O—$(CF_2O)_2$—$OCF_3$,
$F_2C=CF$—O—$(CF_2O)_3$—$OCF_3$,
$F_2C=CF$—O—$(CF_2O)_4$—$OCF_3$.

Specific examples of suitable perfluorinated allyl ether comonomers include:
$F_2=CF$—$CF_2$—O—$CF_3$
$F_2C=CF$—$CF_2$—O—$C_2F_5$
$F_2C=CF$—$CF_2$—O—$C_3F_7$
$F_2C=CF$—$CF_2$—O—$CF_2$—O—$(CF_2)$—F,
$F_2C=CF$—$CF_2$—O—$CF_2$—O—$(CF_2)_2$—F,
$F_2C=CF$—$CF_2$—O—$CF_2$—O—$(CF_2)_3$—F,
$F_2C=CF$—$CF_2$—O—$CF_2$—O—$(CF_2)_4$—F,
$F_2C=CF$—$CF_2$—O—$(CF_2)_2$—$OCF_3$,
$F_2C=CF$—$CF_2$—O—$(CF_2)_3$—$OCF_3$,
$F_2C=CF$—$CF_2$—O—$(CF_2)_4$—$OCF_3$,
$F_2C=CF$—$CF_2$—O—$(CF_2)_3$—$(OCF_2)_2$—F,
$F_2C=CF$—$CF_2$—O—$CF_2$—$(OCF_2)_3$—$CF_3$,
$F_2C=CF$—$CF_2$—O—$CF_2$—$(OCF_2)_4$—$CF_3$,
$F_2C=CF$—$CF_2$—O—$(CF_2O)_2$—$OCF_3$,
$F_2C=CF$—$CF_2$—O—$(CF_2O)_3$—$OCF_3$,
$F_2C=CF$—$CF_2$—O—$(CF_2O)_4$—$OCF_3$.

Particular examples of perfluorinated alkyl allyl ether (PAAE's) include unsaturated ethers according to the general formula:

$$CF_2=CF$—$CF_2$—$OR^f$$

wherein $R^f$ represents a linear or branched, cyclic or acyclic perfluorinated alkyl residue. $R^f$ may contain up to 10 carbon atoms, e.g. 1, 2, 3, 4, 5, 6, 7, 8, 9 or 10 carbon atoms.

Preferably R$^f$ contains up to 8, more preferably up to 6 carbon atoms and most preferably 3 or 4 carbon atoms, R$^f$ may be linear, branched and it may contain or not contain a cyclic unit. Specific examples of R$^f$ include perfluoromethyl (CF$_3$), perfluoroethyl (C$_2$F$_5$), perfluoropropyl (C$_3$F$_7$) and perfluorobutyl (C$_4$F$_9$), preferably C$_2$F$_5$, C$_3$F$_7$ or C$_4$F$_9$. In a particular embodiment R$^f$ is linear and is selected from C$_3$F$_7$ or C$_4$F$_9$.

Mixtures of perfluoro (alkyl vinyl) ethers and perfluoro (alkoxy vinyl) ethers may also be used, as well as mixtures of the vinyl and allyl ethers described above.

Perfluorinated alky allyl ethers and alkyl vinyl ethers as described above are either commercially available, for example from Anles Ltd. St. Peterburg, Russia or can be prepared according to methods described in U.S. Pat. No. 4,349,650 (Krespan) or international patent application no. WO 01/46107 (Worm et al) or in Modern Fluoropolymers, J. Scheirs, Wiley 1997 and the references cited therein or by modifications thereof as known to the skilled person.

In one embodiment the fluoropolymer is an FEP polymer and comprises repeating units derived from TFE, HFP and one or more optional fluorinated comonomers, preferably selected front PAVEs and PAAEs. Preferably, the FEP has a melting point of at greater than 150° C.

In one embodiment the fluoropolymer is a THV polymer and comprises repeating units derived from TFE, HFP and VDF and one or more optional fluorinated comonomers, preferably selected from PAVEs and PAAEs. Preferably the THV has a melting point of greater than 150° C.

In one embodiment the fluoropolymer is a HTE polymer and comprises repeating units of TFE, HFP, ethylene and one or more optional fluorinated monomers, preferably selected from PAVEs and PAAEs.

In one embodiment the fluoropolymer is an ETFE polymer and comprises repeating units derived from TFE and ethylene and one or more optional comonomers.

Preferably, the fluoropolymers have a melting point between 150° C. and 315° C., for example between 180 to 280° C., or between 200 and 300° C.

The fluorothermoplastics may be linear or branched in case they contain branched comonomers like HFP. The polymer may also contain longer branches which may be created, for example, by using branching modifiers in the polymerization as described, for example in WO2008/140914 A1.

Non-Melt-Processable Fluoropolymers

Non-melt-processable fluoropolymers include PTFE. PTFE is a tetrafluoroethylene (TFE) homopolymer and may contain up to 1% by weight of perfluorinated comonomers. Comonomers include perfluorinated alpha olefins, such as hexafluoropropylene (HFP), chlorotrifluoroethylene (CTFE), (PAVEs) and allyl ethers (PAAEs).

Typically, the PTFEs suitable for the present disclosure have a melting point (after first melting) within the range of 327 +/−10° C. The PTFEs have a melting point of at least 317° C., preferably at least 319° C. and more preferably at least 321° C. The PTFE's suitable for the present disclosure include high molecular weight PTFE, for example, those having a melt flow index (MFI) of less than 0.1 g/10 min at 372° C. using a 5 kg load (MFI 372/5) of less than 0.1 g/10 min).

Non-melt processable PTFEs tend to have a standard specific gravity (SSG) of between 2.13 and 2.23 g/cm$^3$ as measured according to ASTM 4895. The SSG is a measure for the molecular weight of the PTFE. The higher the SSG, the lower the molecular weight. In one embodiment, ultra-high molecular weight PTFEs are used in the present disclosure, which means PTFE polymers having an SSG of less than 2.17 g/cm$^3$, for example an SSG of between 2.14 and 2.16. Such PTFE polymers and their preparation is described, for example, in WO2011/139807.

PTFEs are conveniently prepared by aqueous emulsion polymerisation as described for example in U.S. Pat. Nos. 2,434,058, 2,965,595 and EP 003 063 A2, EP 0 969 027. In one embodiment, the PTFE is obtained by suspension polymerization.

Suitable PTFEs include, but are not limited to, core-shell polymers. Core-shell PTFEs and their preparation are described, for example in European Parent No Patent EP 1 533 325 B1 and the references cited therein.

In one embodiment the PTFE polymer contains a perfluoroalkyl vinyl ether or a perfluoroalkyl allyl ether as co-monomer, which may optionally have one or more oxygen atoms in the alkyl chain as described, for example, WO2012/012289 A1.

The fluoropolymers are typically prepared by aqueous emulsion polymerization and are obtained as aqueous dispersions. The polymerization is typically carried out with fluorinated emulsifiers. Typical emulsifiers include those that correspond to the formula

Q-Rf-Z-M wherein Q represents hydrogen, Cl or F, whereby Q may be present in a terminal position or not, Rf represents a linear or cyclic or branched perfluorinated or partially fluorinated alkylene having 4 to 15 carbon atoms, Z presents an acid anion, such as COO$^-$ or SO$_3^-$ and M represents a cation including an alkali metal anion or an ammonium ion. Examples fluorinated emulsifiers include those described in EP 1 059 342, EP 712 882, EP 752 432, EP 86 397, U.S. Pat. Nos. 6,025,307, 6,103,843, U.S. Pat. Nos. 6,126,849, 5,229, 480, 5,763,552; 5,688,884, 5,700,859, 5,895,799, WO00/22002 and WO00/71590. The fluorinated emulsifiers may be removed in the work up procedure, for example as described in WO03/051988. Fluoroemulsifier-reduced PTFE dispersions are prone to premature coagulation and have to be stabilized. Preferably, PTFE dispersions are stabilized, for example with non-ionic or anionic, preferably non-aromatic, emulsifiers or by modification of its polymer architecture or both as described, for example in EP 1 533 325 B1, EP 2 902 424 A1, EP 1 529 785 A1, WO2011/014715 A2, US2004/0171736, WO03/059992. Also other fluoropolymer dispersion may be stabilized this way.

Various grades of fluoropolymer and PTFE dispersions are also commercially available, for example from Dyneon GmbH, Burgkirchen Germany and from other fluoropolymer producers.

In one embodiment the fluoropolymers are perfluoropolymers, such as copolymers of TFE and perfluorovinylethers that may contain optional oxygen atoms in the perfluoroalkyl chain (PAVE) and polymers of TFE, HEP and one or more PAVE.

In one embodiment a blend of two or more fluoropolymers is used. The blends may be blends of fluoropolymers as described above but for example having different melting points and/or MFIs. Using a combination of a high melting with a low melting fluoropolymer may help to prepare a denser article by facilitating the sintering process. The lower melting polymer is typically used in lower amounts than the higher melting fluoropolymer. The lower melting fluoropolymer may be regarded as a filler and may be used in amounts as indicated for fillers.

In general, the amounts of comonomers are selected to give a polymer with a melting temperature greater than 150° C. or even greater than 200° C.

The fluoropolymer used in the 3D-printable compositions are preferably solids and in the form of particles. Typical particle size include particles of from about 1 to 150 μm (number average, $D_{50}$). Particle size of solid particles can be determined by microscopy and particle counting software. Compositions of such particles size can be obtained by suspension polymerization of fluoropolymers, or by milling of pellets or billets, or by agglomeration of fluoropolymer particles obtained from emulsion polymerization.

In one embodiment, the 3D printable composition is in the form of an extrudate, for example a filament. Such compositions are suitable for the filament deposition methods. Extrudates may be obtained by extruding the compositions of fluoropolymer and binder and other ingredients into filaments.

Binder Materials

The 3D printable fluoropolymer compositions contain one or more binder that melts or liquefies upon exposure to the energy source of the additive processing device.

In one embodiment the fluoropolymer typically is provided as a solid composition in form of granules or as a powder or as extruded filaments comprising the binder material and other, optional, additives. Suitable binder materials include organic materials, preferably polymers, that have melting points above room temperature, preferably above 40° C. (but below the degradation temperature or melting temperature of the fluoropolymer). However, also polymers that in a strict scientific sense do not melt but soften or become less viscous may be used. Typically, the meltable binder has a melting point or melting range within a temperature from about 40 to about 140° C. Organic materials are materials that have carbon-carbon and carbon-hydrogen bonds and the materials may optionally be fluorinated, i.e. one or more hydrogens may be replaced by fluorine atoms. Suitable materials include hydrocarbon or hydrocarbon mixtures and long chain hydrocarbon esters, hydrocarbon alcohols and combinations thereof and including their fluorinated derivatives. An examples of suitable material includes waxes, sugars, dextrins, thermoplastics having a melting point as described above, polymerized or cross-linked acrylates, methacrylates, and combinations thereof. The waxes may be natural waxes or synthetic waxes. Waxes are organic compounds containing long alkyl chains, for example long chain hydrocarbons, esters of carboxylic acids and long chain alcohols and esters of long chain fatty acids and alcohols, sterols and mixtures and combinations thereof. Waxes also include mixtures of long chain hydrocarbons. The term "long chain" as used herein means a minimum number of 12 carbon atoms.

Natural waxes include beeswax. A major component of the beeswax is myricyl palmitate which is an ester of triacontanol and palmitic acid. Spermaceti occurs in large amounts in the head oil of the sperm whale. One of its main constituents is cetyl palmitate. Lanolin is a wax obtained from wool, consisting of esters of sterols. Carnauba wax is a hard wax containing myricyl cerotate.

Synthetic waxes include paraffin waxes. These are hydrocarbons, mixtures of alkanes usually in a homologous series of chain lengths. They may include saturated n- and iso-alkanes, naphthylenes, and alkyl- and naphthylene-substituted aromatic compounds. Also fluorinated waxes may be used in which case some hydrogen atoms are replaced by fluorine atoms.

Other suitable waxes can be obtained by cracking polyethylene or propylene ("polyethylene wax" or "polypropylene wax"). The products have the formula $(CH_2)_nH_2$, where n ranges between about 50 and 100.

Other examples of suitable waxes include but are not limited to candelilla wax, oxidized Fischer-Tropsch wax, microcrystalline wax, lanolin, bayberry wax, palm kernel wax, mutton tallow wax, petroleum derived waxes, montan wax derivatives, oxidized polyethylene wax, and combinations thereof.

Suitable sugars include for example and without limitation, lactose, trehalose, glucose, sucrose, levulose, dextrose, and combinations thereof.

Suitable dextrins include for example and without limitation, gamma-cyclodextrin, alpha-cyclodextrin, beta-cyclodextrin, glucosyl-alpha-cyclodextrin, maltosyl-alpha-cyclodextrin, glucosyl-beta-cyclodextrin, maltosyl-beta-cyclodextrin, 2-hydroxy-beta-cyclodextrin, 2-hydroxypropyl-beta-cyclodextrin, 2-hydroxypropyl-gamma-cyclodextrin, hydroxyethyl-beta-cyclodextrin, methyl-beta-cyclodextrin, sulfobutylether-alpha-cyclodextrin, sulfobutylether-beta-cyclodextrin, sulfobutylether-gamma-cyclodextrin, and combinations thereof.

Suitable thermoplastics include for example and without limitation, thermoplastics having a melting point of no greater than 180° C., preferably no greater than 140° C. or no greater than 100° C. Examples may include polyethyleneterephthalate (PET), polylactic acid (PLA), polyvinyl chloride (PVC), polymethyl methacrylate (PMMA), polypropylene (PP), bispbenol-A polycarbonate (BPA-PC), polysulfone (PSF), polyether imide (PEI), and combinations thereof.

Suitable acrylates and methacrylates are for example cross-linked or polymerized acrylates including urethane acrylates, epoxy acrylates, polyester acrylates, acrylated (meth)acrylics, polyether acrylates, acrylated polyolefins, and combinations thereof, or their methacrylate analogs.

Other example of suitable binders include but are not limited to binders comprising polymers and polymerized materials selected from, gelatines, celluloses, ethyl cellulose, hydroxyl ethyl cellulose, hydroxyl propyl cellulose, methyl cellulose, hydroxy propyl cellulose, cellulose acetate, hydroxybutylmethyl cellulose, hydroxyethyl cellulose, hydroxyethylmethyl cellulose, glycoses, fructoses, gylcogens, collagens, starches, partially fluorinated thermoplastic fluoropolymers and combinations thereof.

Preferably, the materials are of low molecular weight such that they easily degrade at elevated temperatures for example at temperatures below and including 200° C. and can be easily removed.

The binder material may be present, for example, as particles or may be present, for example, as coating on the fluoropolymer particles. Particle sizes of the binder particles include, for example, from 1 to 150 μm, preferably about 5 micrometers to about 50 micrometers, and most preferably about 10 micrometers to about 30 micrometers. In one embodiment these particle sizes are average particle sizes (number average, ($D_{50}$ or median. Such particle sizes can be determined by microscopy using particle analysing software or from pictures taken from samples by microscopes). Generally, the average particle size of the binder particles preferably is larger than that of the fluoropolymer particles, for example by a factor between 2 and 100, preferably 2 and 10.

The optimum amount of binder material may be determined by mainly two factors: first the amount of binder material should be high enough such that it allows the formation of layers of the desired dimensions, i.e. it has to be present in an effective amount. Secondly, the amount should be minimised with respect to the fluoropolymer content to minimise shrinking of the article during the working up process, to minimise the voids in the finished articles created during the removal step of the binder material. Since solid compositions are used, higher fluoropolymer concentrations may be used than in the liquid 3D printable compositions, for example a fluoropolymer content of up to 90% by weight or even up to 95% by weight (based on the weight of the composition). Typical amounts of binder material include but are not limited to amounts from about 5 to about 20%, from about 8 to about 18%, for example from about 10 to about 15% by weight based on the weight of the total composition.

Other, optional, additives include fillers, pigments, UV enhancers and oxidation catalysts. The 3D-printable compositions may further comprise fillers, pigments or dyes if compatible with the 3D printer used and the thermal work up treatment. Fillers may include but are not limited to silicon carbide, boron nitride, molybdenum sulfide, aluminum oxides, carbon particles, such as graphite or carbon black, carbon fibers, carbon nanotubes. The filler content can be optimized to the system used and may typically be between 0.01 to 10% or up to 30% or even up to 50% by weight based on the total weight of the composition depending on the fluoropolymer and binder materials used. The fillers should be in particulate form and have sufficiently small particle size to allow for a homogenous dispersion in the 3D-printable composition. To be compatible with the 3D-printable composition the filler particles advantageously have a particle size of less than 500 µm, preferably less than 50 µm or even less than 5 µm.

Pigments have to be heat-stable at the temperatures applied in the thermal work up procedures, i.e. at least the melting temperature of the non-melt processable fluoropolymer.

Ingredients that increase the irradiation energy absorption from the energy source may also be included in the 3D printable composition. For example, by increasing the proportion of the applied energy from the energy source, resulting in more efficient heating. Some materials absorb none, or a small portion, of the laser wavelength emitted from an energy source and in such a case, these materials are beneficial. An example includes graphite or carbon black.

Oxidation catalysts may also be included in the 3D-printable composition to accelerate the combustion of binder during the thermal work up procedure. This may help to create a smoother surface and to avoid the formation of surface defects. It is believed that when the combustion of the binder material is not completed when the surface particles fuse during a sintering step trapped combustion gases may lead to formation of microbubbles or micro cracks on the surface of the sintered article. The oxidation catalyst may accelerate the combustion such that the combustion gases have evaporated before the fluoropolymer particles on the surface fuse. Oxidation catalysts are described for example in U.S. Pat. No. 4,120,608 and include cerium oxides or other metal oxides.

In one embodiment the 3D printable composition comprises from 20 to 95% wt. or from 70 to 90% wt. of a fluoropolymer particles, preferably of a size between 1 and 150 µm;
from 5 to 70% or from 5 to 20% of the binder material, preferably a binder material that melts or liquefies at a temperature between 40 and 180° C., preferably between 50° C. and 100° C. preferably in the form of particles having a particle size of from 2 µm to 300 µm, or from 1 µm to 150 µm, from 0 to 50% wt. of filters,
from 0 to 15% wt. of other optional ingredients wherein the total weight of the composition is 100%.

Additive Processing by Melting or Liquefying a Binder Material

For preparing a fluoropolymer article, the 3D printable composition is subjected to additive processing in an additive processing device. The 3D-printable compositions may be optimized for different types of 3D printers and 3D-printing methods.

The solid composition of particles or the filament composition is entered into the additive processing machine (3D printer) providing the appropriate heat source, for example a 3D thermal printer (having a heat source, such a thermal print heads) or a selective laser sintering or melting primer having a laser as a heat source, as described above for selective laser melting, or the extrusion device in ease of using an FDM printer, to create a three-dimensional object. The resulting object, also referred to as "green body" may be removed from the unreacted powder or filament and subjected to a heat treatment to remove the binder material. Conveniently this is carried out by heat treatment to degrade and/or evaporate the binder material. The temperatures are chosen such that the fluoropolymer article does not melt or gets destroyed. Such fluoropolymers articles will retain their shape. The healing and subsequent cooling regime may be controlled to avoid bending of the object or formation of cracks in the object.

The resulting object may then be subjected to another heat treatment at higher temperatures to allow sintering of the fluoropolymer. During sintering the fluoropolymer particles fuse. The temperatures are chosen such that the fluoropolymer article does not melt or gets destroyed. In case of non-melt processable fluoropolymers the temperatures may be actually above the melting temperature of the fluoropolymer but because of the high melt viscosity of the fluoropolymer this will not change the overall shape of the article. The sintering temperatures may be chosen to be up to about 20° C. above the melting point of the fluoropolymer. For the other types of fluoropolymers a sintering step may not be carried out and the temperatures used for degrading and/or removing the binder may be selected to be below the melting point of the polymer, for example temperatures at least 1° C. below the melting point or at least 10° C. below the melting point of the fluoropolymer.

A typical heat treatment regime may include a first heating cycle to degrade the binder material followed by another heating cycle wherein the temperature of the other heating cycle is higher than that of the first heating cycle. During the first heating cycle the article may turn black due to residues of the binder material, while the article may turn white after the second heating cycle due to the removal of residual binder material. The other heat treatment may include sintering, for example a heat treatment at temperature at or above the melting point of the fluoropolymer, typically at temperatures including temperatures up to 20° C. above the melting point. The heat regimes chosen will depend on the type of binder material and fluoropolymer used in the 3D printable compositions and also on the type of article to be prepared.

The final article may have shrunk to some extent compared to the green body. By doing control runs the shrinking can be taken into account when programming the additive processing machine. Shrinking can be minimised by maximizing the fluoropolymer content.

Articles

Articles of different shapes, designs and functions may be obtained by the additive processing methods described herein. Such shaped articles include but are not limited to bearings, for example friction bearings or piston bearings, gaskets, shaft seals, ring lip seals, washer seals, O-rings, grooved seals, valves and valve seats, connectors, lids, tubing and containers. The articles obtained by the described processes may be components of other articles. In particular articles of small dimensions may be conveniently produced by the methods described herein. In one embodiments fluoropolymer articles having at their longest axis or diameter of from about 0.1 to about 200 mm may be produced.

Fluoropolymer articles of big and small dimensions may be produced. The size of the additive processing device may set a limitation to the size of the articles that may be produced. Articles of small dimensions may also be conveniently produced by the methods described herein. An article comprising a 3D-printed fluoropolymer can be prepared having a longest axis (as the case may be this may also be a diameter) that is smaller than 1.0 cm or even smaller than 0.7 mm. In one embodiment small fluoropolymer articles may be produced having a longest axis or diameter of from about 0.01 to about 1.0 mm, or from 0.7 to 1.5 cm. In another embodiment articles may be produced, for example articles having a smallest axis or diameter of at least 1.1 mm.

The fluoropolymers may be 3D-printed into articles that have at least one element or part of a defined geometrical shape. Defined geometrical shapes include but are not limited to circles, semicircles, ellipses, half-spheres, squares, rectangles, cubes, polygons (including but not limited to triangles hexagons, pentagons, and octagons) and polyhedrons. The shapes may be three-dimensional and include pyramids, cuboids, cubes, cylinders, half-cylinders, spheres, half-spheres). The shapes also include shapes composed of different shapes like diamonds (combination of two triangles). For example, a honeycomb structure contains several hexagons as geometrical elements. In one embodiment the geometrical shape has an axis or diameter of at least 0.5 millimetres, or at least one millimetre or at least 2 millimetres or at least one centimeter. In one embodiment that geometrical shape has an axis or a diameter of less than 50 cm, or less than 15 cm or even less than and including 1.5 cm or even less than and including 1.1 mm. In one embodiment, the article has a wall of a thickness of less than 0.5 cm, preferably less than 0.01 cm, for example from 1 µm up to 1 cm, preferably up to 0.5 cm or up 0.01 cm.

In one embodiment of the present disclosure a fluoropolymer article is produced containing a 3D-printed fluoropolymer that is a "green body". In such embodiment, the article comprises from 10 to 50% by weight of the binder material.

In another embodiment of the present disclosure a fluoropolymer article is produced containing a shaped fluoropolymer that is a "green body". In such embodiment, the article comprises from 1 to 25% by weight of a reaction product of a combustion reaction of the binder material.

Fluoropolymer articles of different shapes, designs and functions may be obtained. Also articles comprising the fluoropolymer articles of different designs and functions may be obtained. Examples of articles and fluoropolymer articles may include but are not limited to bearings, for example friction bearings or piston bearings, gaskets, shaft seals, ring lip seals, washer seals, O-rings, grooved seals, valves and valve seats, connectors, lids and containers. The article may be medical implants, chemical reactors, screws, cogwheels, joints, bolts, pumps, electrodes, heat exchangers, mixers, turbines, electrical transformers, electrical insulators, extruders or the articles may be components of other articles including the above articles. The articles may be used in applications where resistance to acids, bases, fuels, hydrocarbons is required; in applications where non-stick properties are required, in application where heat resistance is required and in applications with a combination of the aforementioned requirements.

Preferably, the articles or components thereof contain the 3D-printed fluoropolymer wherein the fluoropolymer has been 3D-printed into structures that contain one or more than one channels, perforations including through holes and or half holes, honeycomb structures, essentially hollow structures and combinations thereof. Such structures may be flat, curved or spherical.

List of Particular Embodiments

The following lists of exemplary embodiment is provided to further illustrate the present disclosure without intending to limit the disclosure to the specific embodiments listed.

List 1

1. Method of producing a fluoropolymer article comprising subjecting a composition comprising fluoropolymer particles to additive processing in an additive processing device containing at least one energy source.
2. The method of embodiment 1 wherein the composition comprises at least one binder material capable of binding the fluoropolymer particles to form a layer in a part of the composition that has been exposed to the energy source of the additive processing device and the method comprises subjecting a part of the composition to exposure of the energy source to form a layer.
3. The method of any one of the preceding embodiments wherein the composition comprises at least one binder material capable of binding fluoropolymer particles to form a layer in a part of the composition that has been exposed to the energy source by melting upon exposure of the composition to the energy source of the additive processing device, and wherein the method comprises subjecting a part of the composition to exposure of the energy source to form a layer.
4. The method of any one of the preceding embodiments wherein the composition comprises at least one binder material capable of binding fluoropolymer particles to form a layer in a part of the composition that has been exposed to the energy source of the additive processing device by melting upon exposure of the composition to the energy source of the additive processing device and wherein the method comprises subjecting a part of the composition to exposure of the energy source to form a layer and wherein the energy source of the device is a heat source.
5. The method of any one of the preceding embodiments wherein the composition comprises at least one binder material capable of binding fluoropolymer particles to form a layer in a part of the composition that has been exposed to the energy source of the additive processing device and wherein the binder material forms a layer by melting upon exposure of the composition to the energy source of the additive processing device and wherein the additive processing device is a 3D printer selected from selective laser sintering printers, selective laser melting printers, 3D thermal printer, electron beam melting printer.
6. The method of any one of the preceding embodiments wherein the composition comprises at least one binder material capable of binding fluoropolymer particles to form a layer in a part of the composition that has been exposed to the energy source of the additive processing device by melting upon exposure of the composition to the energy source of the additive processing device and wherein the method comprises subjecting a part of the composition to exposure of the energy source to form a layer and wherein the energy source of the device is a heat source and wherein the binder material has a melting point of at least 40° C.

7. The method of any one of the preceding embodiments wherein the composition comprises at least one binder material capable of binding fluoropolymer particles to form a layer in a part of the composition that has been exposed to the energy source of the additive processing device by melting upon exposure of the composition to the energy source of the additive processing device and wherein the method comprises subjecting a part of the composition to exposure of the energy source to form a layer and wherein the energy source of the device is a heat source and wherein the binder material is a wax.

8. The method of any one of the preceding embodiments wherein the composition comprises at least one binder material capable of binding fluoropolymer particles to form a layer in a part of the composition that has been exposed to the energy source of the additive processing device by inciting upon exposure of the composition to the energy source of the additive processing device and wherein the method comprises subjecting a part of the composition to exposure of the energy source to form a layer and wherein the energy source of the device is a heat source and wherein the composition is a solid composition of particles.

9. The method of any one of the preceding embodiments wherein the composition comprises at least one binder material capable of binding fluoropolymer particles to form a layer in a part of the composition that has been exposed to the energy source of the additive processing device by melting upon exposure of the composition to the energy source of the additive processing device and wherein the method comprises subjecting a part of the composition to exposure of the energy source to form a layer and wherein the energy source of the device is a heat source and wherein the fluoropolymer particles have a particle size of from about 1 to about 500 µm, preferably from about 1 to about 150 µm.

10. The method of any one of the preceding embodiments further comprising at least one heat treatment to remove the binder material.

11. The method of any one of the preceding embodiments wherein the composition comprises at least one binder material capable of binding, fluoropolymer particles to form a layer in an area exposed to the energy source of the additive processing device and wherein the method further comprises subjecting the article to a heat treatment to remove binder material by evaporation.

12. The method of any one of the preceding embodiments wherein the composition comprises at least one binder material capable of binding fluoropolymer particles to form a layer in an area exposed to the energy source of the additive processing device and wherein the method comprises subjecting the article to a heat treatment to remove binder by thermal degradation.

13. A fluoropolymer article obtained by the additive processing of any one of embodiments 1 to 12.

14. The article of embodiment 13 comprising from 0.1 to 30% by weight of one or more filler.

15. An article comprising a component, wherein the component is a fluoropolymer article obtained by additive processing according to any one of embodiments 1 to 12.

16. 3D-printable fluoropolymer composition for 3D printing using a heat source, the composition comprising fluoropolymer particles and a binder material that melts upon exposure of the composition to the energy source.

17. The 3D printable composition of embodiment 16, wherein the composition is a solid composition.

18. Use of a composition of embodiment 16 or 17 for 3D printing using a heat source.

List 2

1. Method of producing a fluoropolymer article comprising subjecting a composition comprising fluoropolymer particles and a binder material to additive processing in an additive processing device containing at least one energy source and wherein the fluoropolymer is a homopolymer or copolymer of tetrafluoroethylene (TFE) and wherein the binder material is capable of binding the fluoropolymer particles to form a layer in a part of the composition that has been exposed to the energy source of the additive processing device and the method further comprises subjecting a part of the composition to exposure of the energy source to form a layer.

2. The method of embodiment 1 wherein the fluoropolymer is a homopolymer of TFE that may contain up to 1% by weight based of perfluorinated comonomers.

3. The method of any one of embodiment 1 or 2, wherein the fluoropolymer has a melt flow index (MFI) of less than 0.1 g/10 min at 372° C. using a 5 kg load.

4. The method of any one of embodiments 1 to 3 wherein the fluoropolymer is a copolymer of TFE and wherein the TFE content is from 70% by weight up to but excluding 99% by weight.

5. The method of any one of embodiments 1 to 4 wherein the fluoropolymer is a copolymer of TFE and wherein the TFE content is from 70% by weight up to but excluding 99% by weight and wherein fluoropolymer has a melting point between 260° C. and 315° C.

6. The method of any one of embodiments 1 to 5 wherein the fluoropolymer is a copolymer of TFE and wherein the TFE content is from 70% by weight up to but excluding 99% by weight and wherein the fluoropolymer has an MFI at 372° C. and a 5 kg load from 1 to 50 g/10 min.

7. The method of any one of embodiments 1 to 6 wherein the fluoropolymer is a copolymer of TFE and wherein the TFE content is from 70% by weight up to but excluding 99% by weight and wherein the comonomers are selected from ethene, hexafluoroprotene (HFP), vinylidene fluoride (VDF), perfluoro ethers of the general formula:

$$CF_2=CFO(R_{f1}O)_n(R_{f2}O)_mRf$$

where $R_{f1}$ and $R_{f2}$ are different linear or branched perfluoroalkylene groups of 2-6 carbon atoms, m and n are independently 0-10, and Rf is a perfluoroalkyl group of 1-6 carbon atoms.

8. The method of any one of embodiments 1 to 7 wherein the fluoropolymer is a copolymer of TFE and wherein the TFE content is from 70% by weight up to but excluding 99% by weight and wherein the fluoropolymer is selected from FEP (copolymers of TFE, hexafluoropropene (HFP) and optionally perflourinated vinyl ethers), THV (copolymers of TFE, HFP and vinylidene fluoride (VFP), PFA (copolymers of TFE and perfluoro alkyl vinyl ethers or perfluoro alkyl allyl ethers), HTE (copolymers of TFE, HFP and ethene) and ETFE (copolymers of TFE and ethene), and combinations thereof.
9. The method of any one of embodiments 1 to 8 wherein the fluoropolymer particles have a particle size of from 1 to 150 µm (number average, $D_{50}$).
10. The method of any one of embodiments 1 to 9 wherein the binder material melts or liquefies upon exposure to the energy source of the additive processing device and binds or encapsulates fluoropolymer particles.
11. The method of any one of embodiments 1 to 10 wherein the binder material is an organic material having carbon-carbon bonds and carbon-hydrogen bonds and melts between 40° C. and 180° C., preferably between 40° C. and 140° C.
12. The method of any one of embodiments 1 to 11 wherein the binder material is an organic material having carbon-carbon bonds and carbon-hydrogen bonds and liquefies upon exposure to the energy device by which is meant that the material encapsulates or binds the fluoropolymer particles.
13. The method of any one of embodiments 1 to 12 wherein the binder material is a wax.
14. The method of any one of embodiments 1 to 13 wherein the binder material comprises organic particles selected from wax, sugars, dextrins, and thermoplastic polymers melting between 40° C. and 180° C., polyethylene glycols melting between 40° C. and 180° C. and polymerized or cross-linked acrylates, methacrylates and combinations thereof.
15. The method of any one of embodiments 1 to 14 wherein the method comprises:
    (i) providing a composition comprising a 3D printable fluoropolymer composition comprising fluoropolymer particles and binder material and optionally other ingredients;
    (ii) causing the binder to melt or to liquefy and to bind fluoropolymer particles by either (a): directing energy from the energy source of the additive processing device to a selected location of the 3D printable composition and causing the binder material to melt or to liquefy and to bind fluoropolymer particles in the selected location; or (b): directing a selected location of the 3D printable composition so the energy source and causing the binder material to melt or to liquefy and to bind fluoropolymer particles, or a combination of (a) and (b);
    (iii) directing either (c) the energy source away from the 3D printable composition, or vice-versa (d) directing the 3D printable composition away from the energy source or both to avoid the binder material to bind fluoropolymer particles in the non-selected locations, or a combination of (c) and (d);
    (iv) repeating steps (ii) and (iii), and if necessary also step (i), to form multiple layers and create an article.
16. The method of any one of embodiments 1 to 15 wherein the binder material is a solid particulate material having a particle size of from 1 to 150 µm.
17. The method of any one of embodiments 1 to 16 wherein the composition is a solid composition of particles.
18. The method of any one of embodiments 1 to 17 wherein the composition is an extrudable composition.
19. The method of any one of embodiments 1 to 14 and 16 to 18 comprising:
    (i) providing an extrudable composition comprising a 3D printable fluoropolymer composition comprising fluoropolymer particles and the binder material and optionally other ingredients;
    (ii) extruding the composition to a selected location wherein the binder material has been molten or liquefied by the energy source of the device to bind the fluoropolymer particles,
    (iii) repeating step (ii) and if necessary also step (i) to form multiple layers and create an article.
20. The method of any one of embodiments 1 to 19 wherein the composition comprises:
    from 20 to 95% wt, preferably from 70 to 90% wt. of fluoropolymer particles, preferably of a size between 1 and 150 µm;
    from 5 to 70%, preferably from 5 to 20% of the binder material;
    from 0 to 50% wt. of fillers;
    from 0 to 15% wt. of other optional ingredients wherein the total weight of the composition is 100% wt.
21. The method of any one of embodiments 1 to 20 further comprising applying a heat treatment to remove the binder material.
22. A composition for producing an article by additive processing in an additive processing comprising the composition of any one of embodiments 1 to 14, 16 to 18, 20 and 21.
23. A 3D-printed fluoropolymer obtainable by the method of any one of embodiments 1 to 21.
24. An article comprising a 3D-printed fluoropolymer obtainable by the method of any one of embodiments 1 to 21.
25. The article of embodiment 24 selected from friction bearings, piston bearings, gaskets, shaft seals, ring lip seals, washer seals, O-rings, valve seats, connectors and lids.

The disclosure will now be further illustrated by examples and test method without intending the disclosure to be limited to the tests and examples below.

Test Procedures

Melt Flow Index (MFI):
Melt flow index can be measured with a melt indexer (from Göttfert, Werkstoffprüfmaschinen GmbH, Germany) according to DIN EN ISO 1133 using a 5 kg load and a temperature of 372° C. (MFI 372/5). The extrusion time is one hour.

Melting Point:
Melting points can be determined by DSC (a Perkin Elmer differential scanning calorimeter Pyris 1) according to ASTM D 4591. 5 mg samples are heated at a controlled rate of 10° C./min to a temperature of 380° C. by which the first melting temperature is recorded. The samples are then cooled at a rate of 10° C./min to a temperature of 300° C. and then reheated at 10° C./min to a temperature at 380° C. The melting point observed at the second heating period is referred to herein as the melting point of the polymer (melting point of the once molten material).

Solid Content:
The solid content (fluoropolymer content) of the dispersions can be determined gravimetrically according to ISO 12086. A correction for non-volatile inorganic salts was not carried out.

SSG Density of Fluoropolymers:
The standard specific gravity (SSG) can be measured according to ASTM 4895.

SSG Density of the Fluoropolymer Articles:

The density of fluoropolymer articles was measured in n-butyl acetate according to ASTM 4895.

Example 1

1.8 g PFA powder (PFA 6503 PAZ; MFI=3; average particle size: 27 µm, melting point 310° C.) from Dyneon GmbH, Burgkirchen Germany, were mixed with 0.2 g MICROPRO 400 (micronized polypropylene wax from Micro Powders Inc, Tarrytown, N.Y., USA; particle size of 5.0 to 7.0 micron, maximum particle size 22 micron, melting point 140-143° C.). The powder mixture was put in a 50 ml glass jar and rotated on a rolling bank mixer at about 50 rpm for 15 minutes. The powder was spread on a piece of paper, 2 sheets of paper were used as a shim and the thickness of the resulting powder layer was approximately 200 micron. It was covered with a 2 mil thick PET film. A soldering iron was heated to 218° C. and the hot tip was slowly moved over an approximately 1×1 cm area. Only very slight pressure was applied and the PET film was barely deformed. The powder mixture looked partially incited where the hot tip had touched the PET film and after the PET film was removed a solid part of approximately 1×1 cm size could be recovered. The experiment was repeated as described above, but the part was not recovered and a second layer of powder was spread on top of the first layer and covered with the PET film. Then the same area of the second layer was heated with the hot tip. The PET film then was removed, and the solid part was extracted from the powder. It was observed that the two layers had melted together and formed a solid object.

Example 2

1.8 g PTFE powder (PTFE paste TF2073Z) from Dyneon GmbH, Burgkirchen Germany, were mixed with 0.2 g MICROPRO 400 (micronized polypropylene wax from Micro Powders Inc, Tarrytown, N.Y., USA; particle size of 5.0 to 7.0 micron, maximum particle size 22 micron, melting point 140-143° C.). The powder mixture was put in a 50 ml glass jar and rotated on a rolling bank mixer at about 50 rpm for 15 minutes. The powder was spread on a piece of paper, 2 sheets of paper were used as a shim and the thickness of the resulting powder layer was approximately 200 micron. It was covered with a 2 mil thick PET film. A soldering iron was heated to 218° C., and the hot tip was slowly moved over an approximately 1×1 cm area. Only very slight pressure was applied and the PET film was barely deformed. The powder mixture looked partially melted where the hot tip had touched the PET film and after the PET film was removed a solid part of approximately 1×1 cm size could be recovered. The experiment was repeated as described above, but the part was not recovered and a second layer of powder was spread on top of the first layer and covered with the PET film. Then the same area of the second layer was heated with the hot tip. The PET film then was removed, and the solid part was extracted from the powder. The loose powder was trimmed from the edges. The part was determined to weigh 19.06 mg. The part was put on a quartz plate in an atmospheric furnace (Hotspot 110 Furnace, made by Zicar Zirconia, Florida, N.Y. USA) heated from room temperature to 360° C. in 45 minutes and held at 360° C. for 2 hours. The furnace was allowed to cool to room temperature and the part was removed. It was dark grey. The weight loss was 11%.

Examples 1 and 2 demonstrate that three dimensional object can be created from a powdered bed using a heat source as is the principle in 3D thermoprinting or laser melting.

Example 3

In this example a filament comprised of polylactic acid and PTFE was extruded via FDM to make a part. Pellets were made comprising of 60 wt % Ingeo PLA Biopolymer 4043D (NatureWorks, Minnetonka, Minn. 55345) and 40 wt % TFM 1610 (3M Dyneon). The pellets were then made into a filament of approximately 1.7 mm diameter for the use on a FDM 3D printer.

A Hyrel 3D's System 30M was used for printing and an MK2-250 extruder head for flexible filaments was used. The nozzle diameter was 0.6 mm. 3D articles (prisms) were printed with approximate dimensions of 4 cm×4 cm×1 cm.

The articles can be directly placed in a furnace to burn out the PLA and sinter the PTFE. The following conditions were used: Ramp to 180° C. over 4 hours, ramp to 230° C. over 20 hours, ramp to 275° C. over 4 hours, ramp to 325° C. over 4 hours, hold at 325° C. for 48 hours, ramp to 400° C. over 4 hours, hold at 400° C. for 4 hours, let cool naturally (no active cooling). Upon sintering, the resulting PTFE articles retained their color but non-uniform shrinking occurred.

The invention claimed is:

1. A method of using an additive processing device containing at least one energy source for producing a fluoropolymer article; the method comprising
    (i) depositing a solid composition in a defined area, the solid composition comprising
        a) fluoropolymer particles wherein the fluoropolymer is a homopolymer of tetrafluoroethylene that may contain up to 1% by weight of perfluorinated comonomers based on the total weight of the fluoropolymer, or a copolymer of tetrafluoroethylene and one or more perfluorinated, partially fluorinated, or non-fluorinated comonomers, wherein the tetrafluoroethylene content is from 70% by weight up to but excluding 99% by weight; and
        b) a binder material, wherein the binder material is present as binder particles or the fluoropolymer particles are coated with the binder material;
    (ii) subjecting a part of the deposited solid composition to exposure to the energy source of the additive processing device, wherein the binder material melts or liquefies upon exposure to the energy source and binds or encapsulates the fluoropolymer particles to form a layer from the part of the deposited solid composition exposed to the energy source; and
    (iii) sequentially repeating (i) depositing the solid composition and (ii) subjecting a part of the solid composition to exposure of the energy source, wherein the binder material melts or liquefies upon exposure to the energy source and binds or encapsulates the fluoropolymer particles to form a plurality of layers of the fluoropolymer article.

2. The method of claim 1, wherein subjecting the part of the composition to exposure of the energy source comprises:
    (i) causing the binder to melt or to liquefy and to bind fluoropolymer particles by either (c): directing energy from the energy source of the additive processing device to a selected location of the composition and causing the binder material to melt or to liquefy and to bind fluoropolymer particles in the selected location; or
    (d): directing a selected location of the composition to the energy source and causing the binder material to melt or to liquefy and to bind fluoropolymer particles, or a combination of (c) and (d); and (ii) either (e) directing the energy source away from the composition, or (f) directing the composition away from the energy source to avoid the binder material from binding fluoropolymer particles in the non-selected locations, or a combination of (e) and (f).

3. The method of claim 1, further comprising applying a heat treatment to remove the binder.

4. The method of claim 3, further comprising applying a second heat treatment to sinter the fluoropolymer.

5. The method of claim 1, wherein the fluoropolymer is a homopolymer of tetrafluoroethylene that may contain up to 1% by weight based of perfluorinated comonomers.

6. The method of claim 5, wherein the fluoropolymer has a melt flow index of less than 0.1 g/10 min at 372° C. using a 5 kg load.

7. The method of claim 1, wherein the fluoropolymer is a copolymer of tetrafluoroethylene and one or more comonomers and wherein the tetrafluoroethylene content is from 70% by weight up to but excluding 99% by weight.

8. The method of claim 7, wherein the fluoropolymer has a melting point between 260° C. and 315° C.

9. The method of claim 7, wherein the fluoropolymer has an MFI at 372° C. and a 5 kg load from 1 to 50 g/10 min.

10. The method of claim 7, wherein the comonomers are selected from ethylene, hexafluoropropylene, vinylidene fluoride, perfluoro ethers of the general formula:

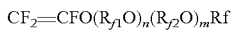

$$CF_2=CFO(R_{f1}O)_n(R_{f2}O)_mRf$$

where $R_{f1}$ and $R_{f2}$ are different linear or branched perfluoroalkylene groups of 2-6 carbon atoms, m and n are independently 0-10, and Rf is a perfluoroalkyl group of 1-6 carbon atoms.

11. The method of claim 7, wherein the fluoropolymer is selected from copolymers of tetrafluoroethylene, hexafluoropropylene and optionally perflourinated vinyl ethers; copolymers of tetrafluoroethylene, hexafluoropropylene and vinylidene fluoride; copolymers of tetrafluoroethylene and perfluoro alkyl vinyl ethers or perfluoro alkyl allyl ethers; copolymers of tetrafluoroethylene, hexafluoropropylene and ethylene; and copolymers of tetrafluoroethylene and ethylene, and combinations thereof.

12. The method of claim 1, wherein the binder material is an organic material having carbon-carbon bonds and carbon-hydrogen bonds and melts between 40° C. and 140° C.

13. The method of claim 1, wherein the binder material is a solid particulate having a particle size of from 1 to 150 μm (number average, $D_{50}$).

14. The method of claim 1, wherein the composition is a solid composition of the fluoropolymer particles coated with the binder material.

15. The method of claim 1, wherein the composition comprises:
from 20 to 95% wt. of fluoropolymer particles;
from 5 to 70% wt. of the binder material;
from 0 to 50% wt. of fillers;
from 0 to 15% wt. of other optional ingredients wherein the total weight of the composition is 100% wt.

16. The method of claim 15, wherein the composition comprises:
from 70 to 90% wt. of fluoropolymer particles; and
5 to 20% wt. of the binder material.

* * * * *